United States Patent
Wong et al.

(10) Patent No.: US 8,138,648 B2
(45) Date of Patent: Mar. 20, 2012

(54) PERMANENT MAGNET ELECTRIC MOTOR

(75) Inventors: Ben To Fan Wong, Hong Kong (CN); Biao Yu, Shenzhen (CN); Tian Jun Liao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 90 days.

(21) Appl. No.: 12/609,828

(22) Filed: Oct. 30, 2009

(65) Prior Publication Data

US 2010/0109464 A1 May 6, 2010

(30) Foreign Application Priority Data

Oct. 31, 2008 (CN) .......................... 2008 1 0217158

(51) Int. Cl.
*H02K 23/04* (2006.01)
*H02K 5/00* (2006.01)
(52) U.S. Cl. ............ 310/154.01; 310/40 MM; 310/152; 310/154.21; 310/154.36
(58) Field of Classification Search ............ 310/40 MM, 310/154.11, 154.25, 154.36, 154.45, 152, 310/154.01, 154.21, 154.31
See application file for complete search history.

(56) References Cited

U.S. PATENT DOCUMENTS

| | | | | |
|---|---|---|---|---|
| 4,453,097 A | * | 6/1984 | Lordo | 310/154.07 |
| 5,742,110 A | * | 4/1998 | Hefner | 310/154.45 |
| 7,427,817 B2 | | 9/2008 | Uenishi et al. | |
| 7,498,706 B2 | | 3/2009 | Kuroda | |
| 7,528,515 B2 | | 5/2009 | Kuroda | |
| 2007/0200444 A1 | * | 8/2007 | Uenishi et al. | 310/154.21 |

FOREIGN PATENT DOCUMENTS

| | | |
|---|---|---|
| EP | 2157677 A1 | 2/2010 |
| EP | 2157678 A1 | 2/2010 |
| JP | 09224337 A * | 8/1997 |
| WO | WO 2008149603 A1 * | 12/2008 |

OTHER PUBLICATIONS

Machine Traslation WO2008149603 (2008) and JP09224337 (1997).*
Machine translation on WO2008149603 and JP09224337 were included on the previous office action (Mar. 30, 2011).*

* cited by examiner

*Primary Examiner* — Quyen Leung
*Assistant Examiner* — Jose Gonzalez Quinones
(74) *Attorney, Agent, or Firm* — Muncy, Geissler, Olds & Lowe, PLLC

(57) ABSTRACT

A motor comprises a stator and a rotor (20) disposed within the stator. The stator comprises: a housing (31) having a polygon cross section that comprises a plurality of side portions (32a-32d) and a plurality of curved corner portions (33a-33d), each of the corner portions connect two adjacent side portions and curve around a center (O') which is offset from the rotational center (O) of the rotor; and a ring magnet (34) fixed to the inner surface of the housing. An air gap (37) is formed between a peripheral surface of the rotor (35) and an inner surface of the ring magnet (34). The thickness of the ring magnet at portions corresponding to the corner portions (33a-33d) of the housing being larger than the thickness of the ring magnet at portions corresponding to the side portions (32a-32d) of the housing.

19 Claims, 2 Drawing Sheets

PERMANENT MAGNET ELECTRIC MOTOR

CROSS REFERENCE TO RELATED APPLICATIONS

This non-provisional patent application claims priority under 35 U.S.C. §119(a) from Patent Application No. 200810217158.9 filed in The People's Republic of China on Oct. 31, 2008.

FIELD OF THE INVENTION

This invention relates to an electric motor and in particular, to an electric motor having a square stator.

BACKGROUND OF THE INVENTION

A cross section of a conventional permanent magnet DC motor is shown in FIG. 1. The motor 10 comprises a stator and a rotor 15 rotatably mounted confronting the stator. The stator comprises a cylindrical housing 11 with permanent magnets 14 which are fixed to the inner surface of the cylindrical housing 11 and distributed around the rotor 15. As is known, a cylindrical housing is vulnerable to rolling during transportation and is inconvenient to install.

A square motor developed in recent years is shown in FIG. 2. The square motor 20 comprises a stator and a rotor 25. The stator comprises a square housing 21 with permanent magnets 24 fixed to the inner surface of the square housing 21. The rotor 25 is rotatably mounted confronting the stator and surrounded by the magnets 24. The square motor 20 solves the above-mentioned shortcomings of the conventional cylindrical motor 10. However, the square motor 20 has a low space utilization rate since the space near the corner portions of the housing 21 is not used. Furthermore, the outer diameter of the rotor 25 is restricted by the size of the square housing 21 and the thickness of the magnets 24, especially in small motor.

Therefore, there is a desire for an improved motor having a high space utilization rate.

SUMMARY OF THE INVENTION

Accordingly, in one aspect thereof, the present invention provides an electric motor comprising a stator and a rotor rotatably mounted confronting the stator, wherein the stator comprises: a housing having a polygonal cross section comprising a plurality of side portions and a plurality of curved corner portions, each corner portion connecting two adjacent side portions; a permanent magnet fixed to an inner surface of the housing; and an air gap formed between the rotor and the permanent magnet, wherein the permanent magnet is a ring magnet and the thickness of the ring magnet at portions corresponding to said corner portions of the housing being larger than the thickness of the ring magnet at portions corresponding to said side portions of the housing.

Preferably, each of said corner portions curve around a center which is offset from the rotational center of the rotor.

Preferably, the thickness of said air gap at portions corresponding to said corner portions of the housing is larger than the thickness of said air gap at portions corresponding to said side portions of the housing.

Preferably, the thickness of said air gap is largest at portions corresponding to the thickest portions of the ring magnet, and is smallest at portions corresponding to the thinnest portions of the ring magnet.

Preferably, gaps are formed between the ring magnet and said corner portions of the housing.

Preferably, gaps are formed between the ring magnet and said side portions of the housing.

Preferably, the radius of curvature of the inner surface of said corner portions is larger than the radius of curvature of the outer surface of the ring magnet at portions corresponding to said corner portions.

Ideally, the ratio of the radius of curvature of the inner surface of said corner portions to the radius of curature of the inner surface of the ring magnet is between 1.1 and 1.8.

Preferably, the housing has an even thickness.

Preferably, the thickness of the housing at said corner portions is larger than the thickness of the housing at said side portions.

Preferably, the housing has a tetragonal cross section.

The beneficial effects of the present invention include an improved space utilization ratio achieved by the above configuration.

BRIEF DESCRIPTION OF THE DRAWINGS

A preferred embodiment of the invention will now be described, by way of example only, with reference to figures of the accompanying drawings. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
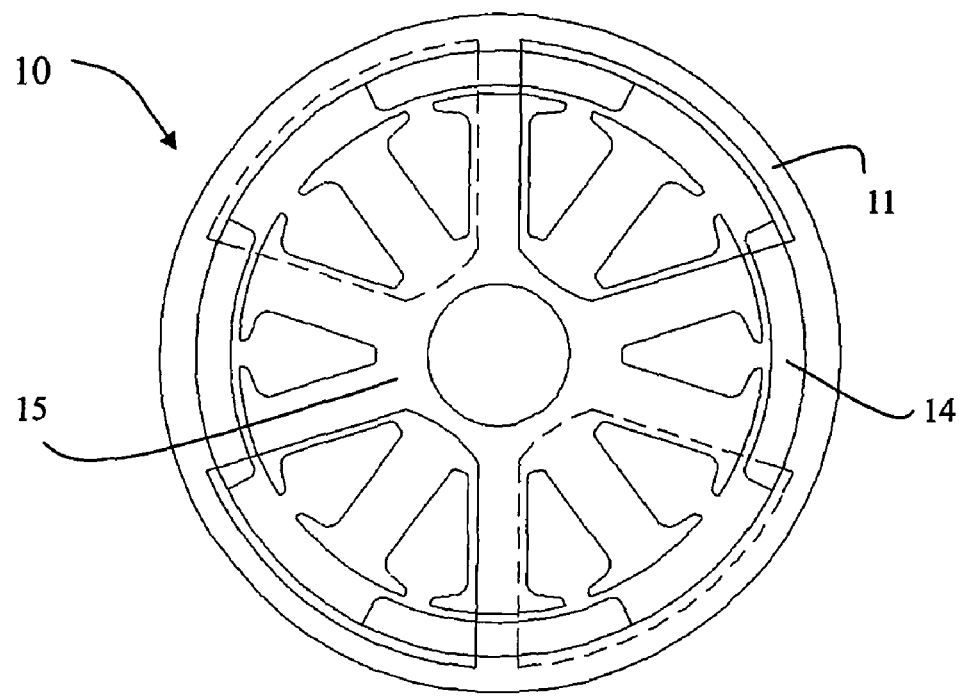
FIG. 1 is a sectional view of a prior art DC motor.
Figure 2:
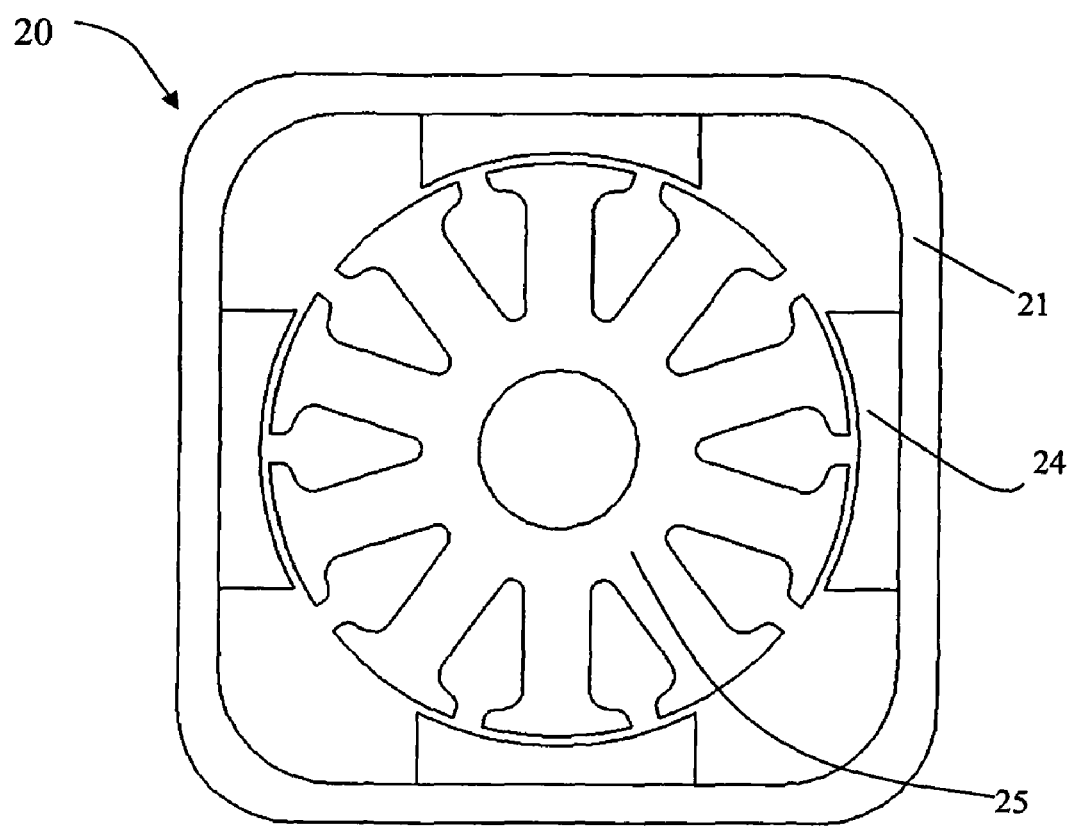
FIG. 2 is a sectional view of another prior art DC motor.
Figure 3:
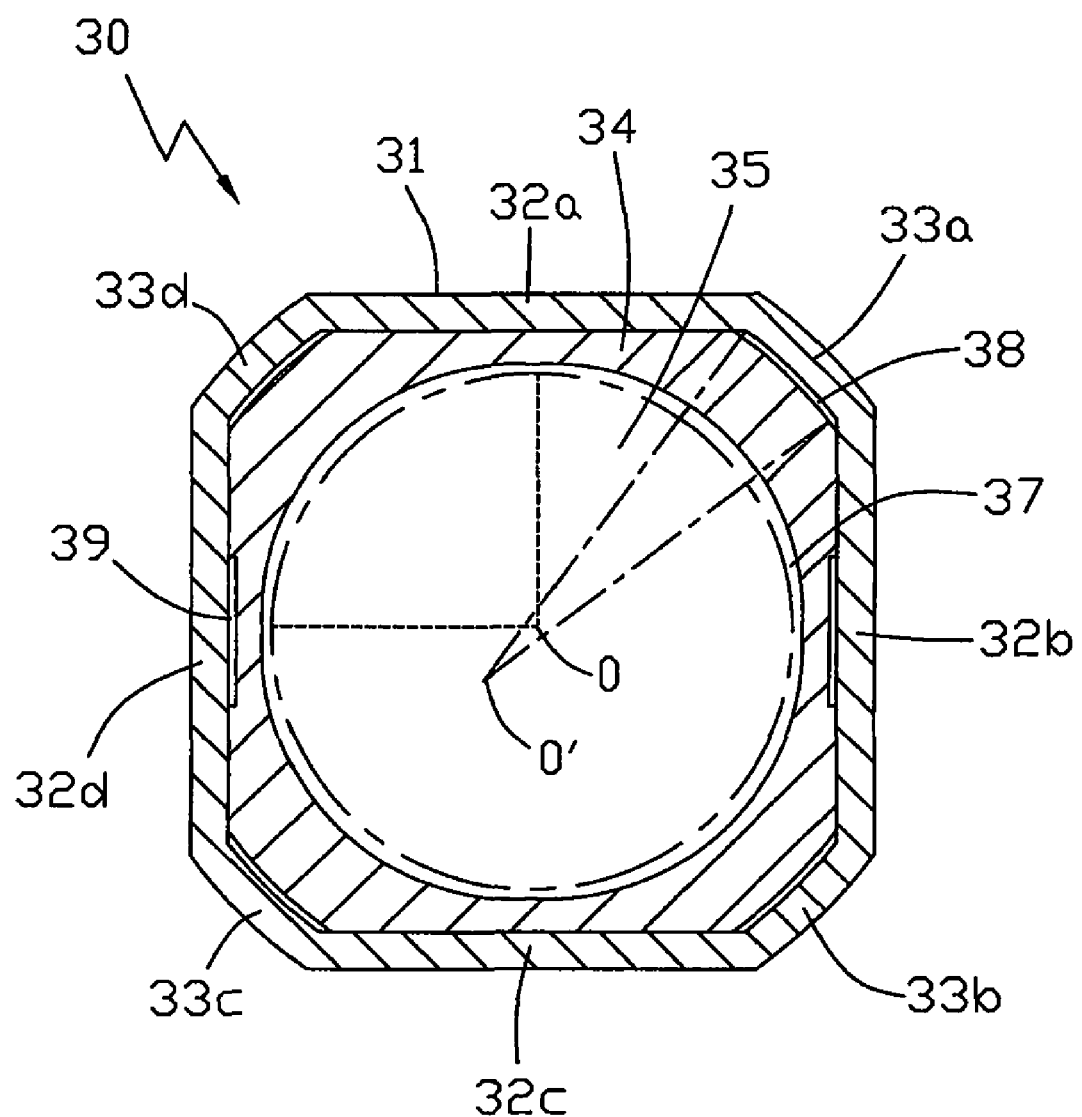
FIG. 3 is a sectional view of a motor in accordance with a preferred embodiment of the present invention.

FIG. 3 is a cross sectional view of a motor according to the preferred embodiment of the present invention. The motor 30 comprises a stator and a rotor 35 (represented symbolically by a dashed line) rotatably mounted confronting the stator. The stator comprises a housing 31 and a ring magnet 34 fixed to an inner surface of the housing 31. The housing 31 is a polygonal tubular shape, comprising four side portions 32a~32d and four curved corner portions 33a~33d. Each corner portion connects to two adjacent side portions. Fox example, corner portion 33a connects two adjacent side portions 32a and 32b, and corner portion 33b connects two adjacent side portions 32b and 32c.

The ring magnet 34 is fixed to an inner surface of the housing 31. The ring magnet 34 has a larger radial thickness at portions corresponding to the corner portions 33a~33d of the housing 31 and has a smaller radial thickness gradually decreasing from the larger thickness portions toward circumferentially portions corresponding to the middle of each side portion of the housing 31. The rotor 35 is surrounded by the ring magnet 34. There is an air gap 37 between an outer surface of the rotor 35 and the inner surface of the ring magnet 34.

The inner surface of the ring magnet 12 not truly a right cylindrical surface as the cross section, which appears to be a circle is slightly convex at portions corresponding to the side portions 32a-d of the housing 31. That is, the hole in the ring magnet has a smaller diameter measured between the side portions compared to the diameter measured between the corner portions. This makes the ring magnet 34 not as easy to break at portions corresponding the side portions 32a-d of the housing 31. Also, the radial thickness of the air gap 37 is uneven, having a smaller radial thickness at portions corresponding to side portions 32a~32d of the housing 31, and having a larger radial thickness at portions corresponding to corner portions 33a-d of the housing 31. In this embodiment, the air gap has a largest radial thickness at portions where the ring magnet 34 has a largest radial thickness and has a smallest radial thickness at portions where the ring magnet 34 has a smallest radial thickness. An uneven air gap will lower the motor's magnet detent torque and lower the risk of demagnetisation.

Furthermore, due to the shape and size of the ring magnet 34, a gap 38 is formed between the ring magnet 34 and each corner portion 33a-33d of the housing 31.

Furthermore, one or more grooves can be formed in an outer surface of the ring magnet 34 corresponding to side portions 32a-d of the housing 31, each of the grooves forming a gap 39 between the ring magnet 34 and a side portion of the housing 31. The gaps 38 and 39 can be filled with glue to fix the ring magnet 34 onto the housing 31. On the other hand, it is easier to insert the ring magnet 34 into the housing 31 due to the gaps 38 between the ring magnet 34 and corner portions of the housing 31.

In the preferred embodiment, as shown in FIG. 3, the housing 31 has an even radial thickness such as 0.8 mm, 0.9 mm or 1.0 mm. Each of the corner portions 33a-33d is curved along an arc whose center O' is offset from the rotational center O of the rotor 35. In particular, the radius of curvature of the inner surface of each corner portion 33a-33d is smaller than the radius of the outer surface of the rotor 35, making the corner portion smoother.

Preferably, the radius of curvature of the inner surface of each corner portion 33a-33d is larger than the radius of curvature of an outer surface of the ring magnet 34 at portions corresponding to the corner portions 33a-d.

It is most preferred if the ratio of the radius of curvature of the inner surface of each corner portion 33a-d to the radius of curvature of the inner surface of the ring magnet 34 is between 1.1 and 1.8. Preferably, the ratio of radius of curvature of the inner surface of each corner portion 33a-33d to the radius of curvature of the inner surface of the ring magnet 34 at portions corresponding to side portions 32a-32d is 11.80/6.84, or approximately 1.73.

The ring magnet 34 is symmetric around the rotational center O of the rotor 35. Optionally the ring magnet is line symmetrical along one of the diagonal lines of the housing 31. It is easier to manufacture a symmetric ring magnet and assemble it to the housing.

In the above embodiments, the housing 31 comprises four side portions and four corner portions, each of which is curved. Alternatively, the housing 31 can comprise more than four side portions and more than four corner portions. Furthermore, the housing 31 could have a larger thickness at each of the corner portions 33a-33d, and have a smaller thickness at each of side portions 32a~32d. For example, in one embodiment, the thickness of each side portion 32a-32d is 1 mm, and the thickness of each corner portion 33a-33d is 1.1 mm.

In the description and claims of the present application, each of the verbs "comprise", "include", "contain" and "have", and variations thereof, are used in an inclusive sense, to specify the presence of the stated item but not to exclude the presence of additional items. Also, although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet electric motor comprising a stator and a rotor rotatably mounted confronting the stator, wherein the stator comprises:
   a housing having a polygonal cross section comprising a plurality of side portions and a plurality of curved corner portions, each corner portion connecting two adjacent side portions;
   a permanent magnet fixed to an inner surface of the housing; and
   an air gap formed between the rotor and the permanent magnet,
   wherein the permanent magnet is a ring magnet and the thickness of the ring magnet at portions corresponding to said corner portions of the housing is larger than the thickness of the ring magnet at portions corresponding to said side portions of the housing; and
   gaps are formed between the ring magnet and said corner portions of the housing;
   wherein each of said corner portions curve around a center which is offset from the rotational center of the rotor.

2. The electric motor of claim 1, wherein the thickness of said air gap at portions corresponding to said corner portions of the housing is larger than the thickness of said air gap at portions corresponding to said side portions of the housing.

3. The electric motor of claim 1, wherein gaps are formed between the ring magnet and said side portions of the housing.

4. The electric motor of claim 1, wherein the radius of curvature of the inner surface of said corner portions is larger than the radius of curvature of the outer surface of the ring magnet at portions corresponding to said corner portions.

5. The electric motor of claim 1, wherein the housing has an even thickness.

6. The electric motor of claim 1, wherein the thickness of the housing at said corner portions is larger than the thickness of the housing at said side portions.

7. The electric motor of claim 1, wherein the housing has a tetragonal cross section.

8. A permanent magnet electric motor comprising a stator and a rotor rotatably mounted confronting the stator, wherein the stator comprises:
   a housing having a polygonal cross section comprising a plurality of side portions and a plurality of curved corner portions, each corner portion connecting two adjacent side portions;
   a permanent magnet fixed to an inner surface of the housing; and
   an air gap formed between the rotor and the permanent magnet,
   wherein the permanent magnet is a ring magnet and the thickness of the ring magnet at portions corresponding to said corner portions of the housing is larger than the thickness of the ring magnet at portions corresponding to said side portions of the housing;
   the thickness of said air gap at portions corresponding to said corner portions of the housing is larger than the thickness of said air gap at portions corresponding to said side portions of the housing; and
   the thickness of said air gap is largest at portions corresponding to the thickest portions of the ring magnet, and is smallest at portions corresponding to the thinnest portions of the ring magnet.

9. The electric motor of claim 8, wherein each of said corner portions curve around a center which is offset from the rotational center of the rotor.

10. The electric motor of claim 8, wherein gaps are formed between the ring magnet and said side portions of the housing.

11. The electric motor of claim 8, wherein the radius of curvature of the inner surface of said corner portions is larger than the radius of curvature of the outer surface of the ring magnet at portions corresponding to said corner portions.

12. The electric motor of claim 8, wherein the housing has a tetragonal cross section.

13. A permanent magnet electric motor comprising a stator and a rotor rotatably mounted confronting the stator, wherein the stator comprises:
   a housing having a polygonal cross section comprising a plurality of side portions and a plurality of curved corner portions, each corner portion connecting two adjacent side portions;
   a permanent magnet fixed to an inner surface of the housing; and
   an air gap formed between the rotor and the permanent magnet,
   wherein the permanent magnet is a ring magnet and the thickness of the ring magnet at portions corresponding to said corner portions of the housing is larger than the thickness of the ring magnet at portions corresponding to said side portions of the housing; and
   the ratio of the radius of curvature of the inner surface of said corner portions to the radius of curvature of the inner surface of the ring magnet is between 1.1 and 1.8.

14. The electric motor of claim 13, wherein each of said corner portions curve around a center which is offset from the rotational center of the rotor.

15. The electric motor of claim 13, wherein the thickness of said air gap at portions corresponding to said corner portions of the housing is larger than the thickness of said air gap at portions corresponding to said side portions of the housing.

16. The electric motor of claim 13, wherein the radius of curvature of the inner surface of said corner portions is larger than the radius of curvature of the outer surface of the ring magnet at portions corresponding to said corner portions.

17. The electric motor of claim 13, wherein the housing has an even thickness.

18. The electric motor of claim 13, wherein the thickness of the housing at said corner portions is larger than the thickness of the housing at said side portions.

19. The electric motor of claim 13, wherein the housing has a tetragonal cross section.

\* \* \* \* \*